(12) United States Patent
Plumridge et al.

(10) Patent No.: US 12,317,012 B2
(45) Date of Patent: May 27, 2025

(54) MULTI-DEVICE WAVELENGTH SELECTIVE SWITCH

(71) Applicant: II-VI Delaware, Inc., Wilmington, DE (US)

(72) Inventors: Jonathan Plumridge, Wilmington, DE (US); Luke Stewart, Wilmington, DE (US); Glenn Baxter, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 169 days.

(21) Appl. No.: 18/167,452

(22) Filed: Feb. 10, 2023

(65) Prior Publication Data
US 2024/0276127 A1 Aug. 15, 2024

(51) Int. Cl.
*H04Q 11/00* (2006.01)
*G02F 1/313* (2006.01)

(52) U.S. Cl.
CPC ....... *H04Q 11/0005* (2013.01); *G02F 1/3131* (2013.01); *G02F 2203/02* (2013.01); *G02F 2203/24* (2013.01); *G02F 2203/50* (2013.01); *H04Q 2011/0016* (2013.01); *H04Q 2011/0026* (2013.01); *H04Q 2011/0035* (2013.01); *H04Q 2011/0049* (2013.01)

(58) Field of Classification Search
CPC ....... H04Q 11/0005; H04Q 2011/0016; H04Q 2011/0026; H04Q 2011/0035; H04Q 2011/0049; G02F 1/3131; G02F 2203/02; G02F 2203/24; G02F 2203/50
See application file for complete search history.

(56) References Cited

U.S. PATENT DOCUMENTS

| | | | | |
|---|---|---|---|---|
| 7,092,599 B2* | 8/2006 | Frisken | ................ | G02B 6/2931 385/24 |
| 7,397,980 B2* | 7/2008 | Frisken | .............. | G02B 6/29383 385/24 |
| 10,461,878 B2* | 10/2019 | Frisken | ............... | H04J 14/0212 |
| 2005/0220394 A1* | 10/2005 | Yamamoto | ............... | G02B 5/08 359/839 |
| 2014/0186038 A1* | 7/2014 | Frisken | ............... | H04J 14/0305 398/50 |
| 2014/0254982 A1* | 9/2014 | Frisken | ................ | G02B 6/3556 385/17 |
| 2020/0264379 A1* | 8/2020 | Frisken | .............. | G02B 26/0833 |

FOREIGN PATENT DOCUMENTS

| | | | | |
|---|---|---|---|---|
| CN | 108293155 B | * | 12/2021 | ............ H04J 14/021 |
| WO | WO-2012159341 A1 | * | 11/2012 | .......... H04J 14/0212 |

* cited by examiner

*Primary Examiner* — Abbas H Alagheband
(74) *Attorney, Agent, or Firm* — Blank Rome LLP

(57) ABSTRACT

Described herein is a wavelength selective switch (100), comprising an input array (102) of optical fibers. The array (102) comprises two or more columns of fibers that are spatially offset in one or both of a switching dimension or a dispersive dimension of the wavelength selective switch (100). Each column (102A, 102B) of fibers is adapted to project respective optical beams. A switching engine (112) is positioned to receive the optical beams and apply an angular switching to the beams to direct the beams to respective output fibers. The optical beams are encoded at respective angles or polarization states such that each column of optical beams is incident onto a different region of the switching engine (112).

18 Claims, 11 Drawing Sheets

MULTI-DEVICE WAVELENGTH SELECTIVE SWITCH

FIELD

The present application relates to optical switching devices and in particular to wavelength selective switches.

Embodiments of the present invention are particularly adapted for integrating the switching functionality for multiple optical sources into a single device. However, it will be appreciated that the invention is applicable in broader contexts and other applications.

BACKGROUND

The continued growth in the worldwide demand for high-speed data has resulted in a pressing need for increased capacity on existing communication channels. Optical networks form the backbone of high-speed telecommunications networks around the world.

With the development of more complex optical networks, the capabilities of optical switching devices are evolving. Switches, such as wavelength selective switches (WSS) are incorporating more input and output ports to manage the increased system demand. Furthermore, WSS modules are expected to contain multiple independent WSS that use shared optical components and electronics.

To achieve increased throughput while containing costs, efforts have been made to incorporate the functionality of switching multiple independent optical sources within a single device. For example, U.S. Pat. No. 7,397,980 to Frisken, entitled "Dual-source optical wavelength processor" and assigned to II-VI DELAWARE, INC. describes an example implementation of a WSS device that can be configured to independently route signals from two independent optical sources. This effectively provides the switching of two WSS devices within a single WSS module.

In the case of multi-source devices, the independent routing can be difficult to maintain as the setting up of switching states of a first optical source may simultaneously couple signals to ports intended for the second source. Current solutions to address these issues add significantly to optical loss, size and cost. Furthermore, multiple devices on a single column of fibers are fundamentally difficult to isolate as there is only the angular degree of freedom to create isolation. In addition, for WSS with a diffraction based switching engine, crosstalk signals from the switching engine diffraction orders from a first device are inherently redirected to the outputs of a second device. Thus, alternative solutions are desired.

Any discussion of the background art throughout the specification should in no way be considered as an admission that such art is widely known or forms part of common general knowledge in the field.

SUMMARY

In accordance with a first aspect of the present disclosure, there is provided a wavelength selective switch, comprising:
- an input array of optical fibers, the array comprising two or more columns of fibers that are spatially offset in one or both of a switching dimension or a dispersive dimension of the wavelength selective switch, each column of fibers being adapted to project respective optical beams; and
- a switching engine positioned to receive the optical beams and apply an angular switching to the beams to direct the beams to respective output fibers;
- wherein the optical beams are encoded at respective angles or polarization states such that each column of optical beams is incident onto a different region of the switching engine.

In one aspect of the disclosure, the optical fibers of each column correspond to an optical source that is independent of optical fibers of others of the two or more columns.

In some embodiments, the wavelength selective switch includes a two dimensional microlens array disposed adjacent to the input array of optical fibers, the microlens array having a microlens corresponding to each of the input optical fibers. In some embodiments, the microlens array is offset from the input array of optical fibers by a predefined distance in the switching dimension or dispersion dimension to provide angular encoding to the respective optical beams.

In some embodiments, the two dimensional microlens array is made up of multiple, separated 1D arrays, each aligned to a respective column of fibers.

In some embodiments, the optical fibers are oriented at respective angles in the switching dimension or dispersion dimension relative to an optical axis to provide angular encoding to the respective optical beams.

In some embodiments, the wavelength selective switch includes a plurality of optical directing elements configured to apply angular encoding to the optical beams.

In some embodiments, optical beams within each column are encoded with a common angle in the switching dimension relative to the optical axis.

In one aspect of the disclosure, the wavelength selective switch includes a focus delay element adapted to apply an optical delay that is dependent on the column from which the optical beam originated. In some embodiments, the focus delay element includes a wedge. In other embodiments, the focus delay element includes a cylindrical lens.

In one aspect of the disclosure, the switching engine includes a liquid crystal on silicon (LCOS) device.

In some embodiments, the wavelength selective switch includes a polarization manipulation module configured to independently manipulate the polarization of each column of optical beams. In some embodiments, the polarization manipulation module is configured to encode the beams of each column of fibers with a corresponding polarization state. Preferably the beams of a first column of fibers are polarized into a first polarization state and the beams of a second column of fibers are polarized into a second polarization state.

In some embodiments, a distance of the spatial offset of the columns of fibers is selected based on a predefined threshold isolation between beams of different columns.

In some embodiments, the input array of optical fibers is formed of a single unitary element. In some embodiments, the input array of optical fibers is formed of a monolithic material.

BRIEF DESCRIPTION OF THE FIGURES

Example embodiments of the disclosure will now be described, by way of example only, with reference to the accompanying drawings in which.

DESCRIPTION

Embodiments of the present invention are adapted to provide a high performance and cost-effective device for coupling multiple groups of fibers into and out of wavelength selective switch (WSS). This enables efficient partitioning of a single switching engine, such that a plurality of independently controlled WSS devices can exist within a single module.

System Overview

Figure 1:
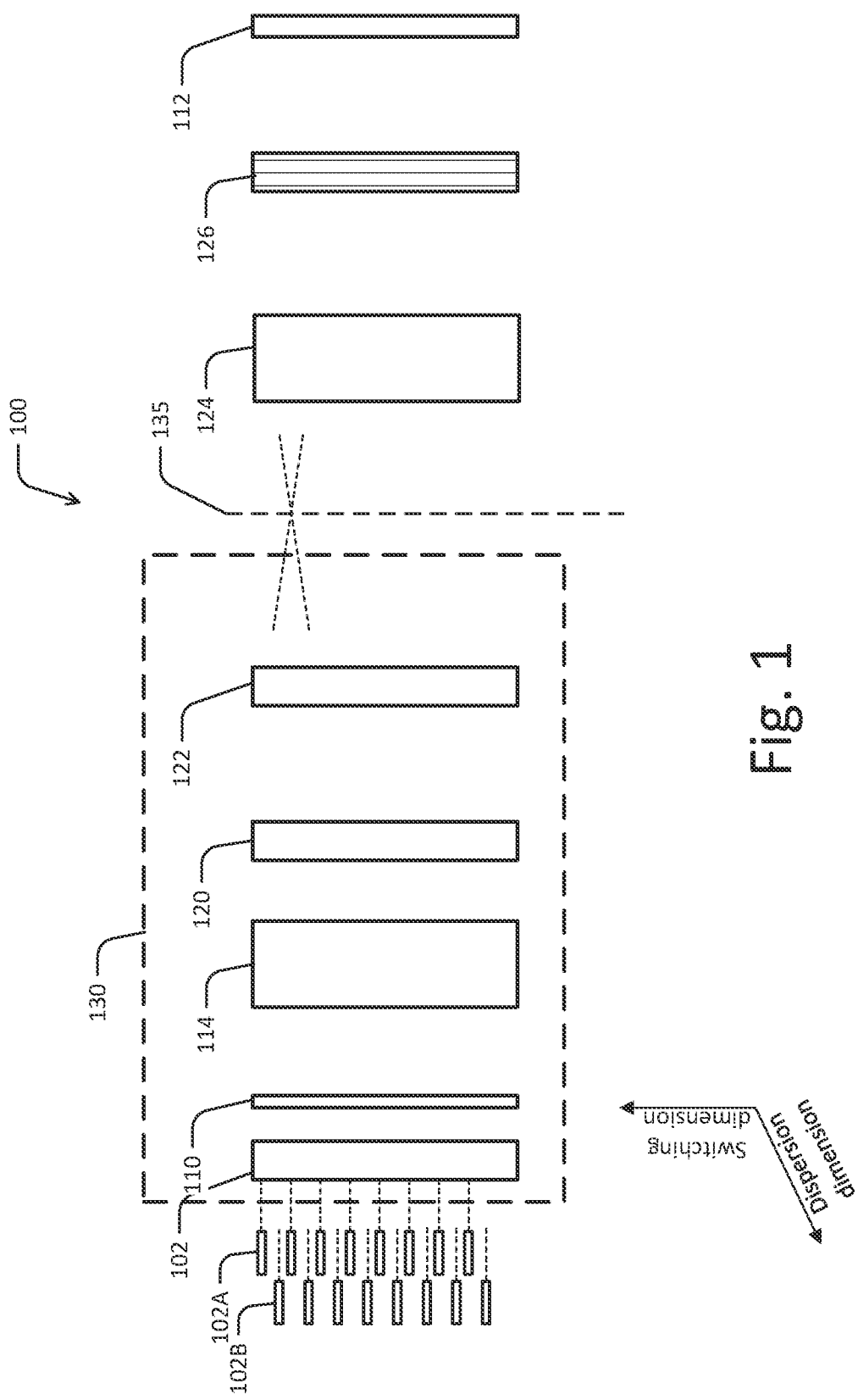
FIG. 1 is a schematic side view of a multi-device WSS according to a first embodiment.

Referring initially to FIG. 1, there is illustrated an optical switching device in the form of a multi-device WSS 100. WSS 100 is configured for switching wavelength channels contained within wavelength division multiplexed (WDM) optical beams between an array 102 of input/output optical fibers which correspond to two or more independent optical sources. WSS 100 includes at least two columns 102A and 102B of optical fibers, which input to form array 102. The optical beams from the input fibers are passed through a two dimensional microlens array 110 before being passed through a polarization diversity module 114, cylindrical lens array 120, a focus delay element 122, primary collimating/focusing elements 124, dispersive element 126 and a switching engine 112. Input fiber array 102, microlens array 110, polarization diversity module 114 and cylindrical lens array 120 all form a front-end 130 of WSS 100. Front-end 130 can be in the form of a single piece or as an arrangement of separate elements. Note that the relative positioning, size and shape of the various optical elements are not show to scale in FIG. 1.

Although array 102 is described as having two columns of optical fibers. It will be appreciated that the columns simply represent linear arrays of fibers and may equivalently be referred to as "rows" depending on the orientation of the device.

Dispersive element 126 is preferably in the form of a diffraction grating or grating/prism (grism) element for spatially separating WDM wavelength channels from each optical beam in the dispersion dimension. The dispersive element operates in a similar manner to that described in U.S. Pat. No. 7,397,980 or U.S. Pat. No. 10,461,878. WSS 100 also includes additional optics such as primary collimating/focusing elements 124 for collimating each dispersed wavelength channel in the switching dimension and focusing them onto the switching engine 112 in the dispersion dimension. The functions of dispersive element 126 and primary collimating/focusing elements 124 are not discussed in detail in this application. Although elements 124 are illustrated as being before dispersive element 126, in some embodiments at least some of the elements 124 may be located after dispersive element 126.

Switching engine 112 is preferably a Liquid Crystal On Silicon (LCOS) device, which acts as a reflective optical phase manipulation device to independently steer each optical beam in the switching dimension. At the device level, LCOS device operates in a similar manner to that described in U.S. Pat. No. 7,092,599 to Frisken, entitled "Wavelength manipulation system and method" and assigned to II-VI DELAWARE, INC., the entire contents of which are incorporated herein by way of cross-reference. However, due to the flexibility available in these devices, the LCOS device is also able to be driven to simultaneously switch beams from multiple sources.

The switching engine 112, e.g., LCOS device, includes a two-dimensional array of pixels formed in a layer of liquid crystal material. In an exemplary embodiment, the LCOS device includes an array of 1280 by 768 pixels. Each pixel is independently electrically drivable to impose a relative phase shift to a local region of an incident optical beam. The pixels are able to be driven at different relative levels to define a phase profile which manipulates the optical wavefront to selectively steer the beam.

The LCOS device steers the dispersed wavelength channels at certain angles along predetermined paths in a return direction such that wavelengths are coupled to respective output ports in each column of fibers. Other wavelength channels may be steered at other angles that shift them away from the output ports, thereby blocking them from the continuing to propagate in the system.

It will be appreciated that in other embodiments, other types of switching engine can be used in place of the LCOS device. By way of example, a micro-electromechanical mirror (MEMS) based optical manipulation device or other type of optical manipulation device may be used as the switching engine of WSS 100.

Figure 2A:
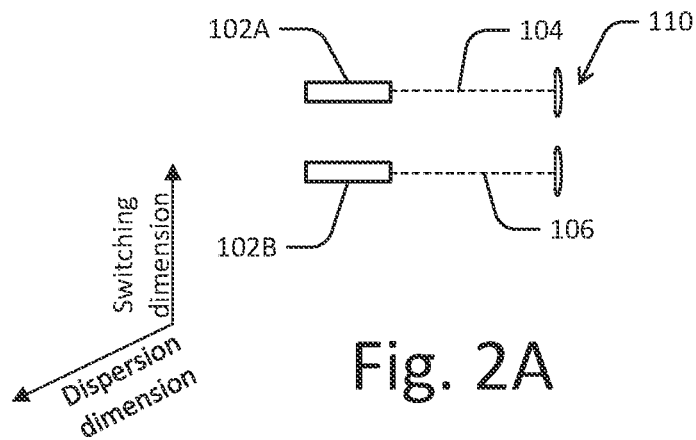
FIG. 2A is a top view schematic illustrating an arrangement of input optical fibers for the WSS of FIG. 1 for switching wavelength channels from two independent optical sources.
Figure 2B:
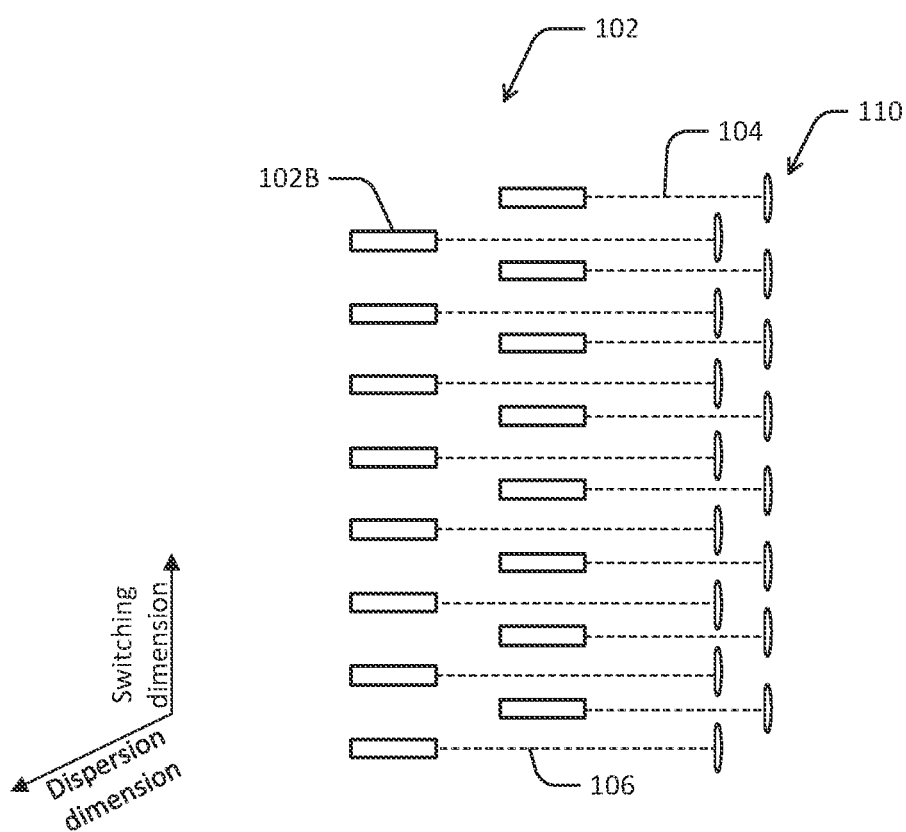
FIG. 2B is a side schematic illustrating the arrangement of input optical fibers for the WSS of FIG. 1 for switching wavelength channels from two independent optical sources.

As best shown in FIG. 2, the array of optical fibers is a two-dimensional array that comprises two or more columns 102A and 102B of fibers that are spatially offset in one or both of a switching dimension or a dispersive dimension of WSS 100. Each fiber in the array is adapted to project a respective optical beam, e.g. 104 and 106 such that each column projects a respective column of optical beams.

In the embodiment illustrated in FIG. 2, array 102 includes two columns 102A and 102B of eight optical fibers wherein the columns are spatially offset in a dispersion dimension of the WSS 100. The dispersion dimension represents the axis in which dispersive element 126 disperses wavelength channels from the optical beams. Typical offsets of columns in the dispersion dimension are in the range of a few hundred microns to one millimeter. However, in some embodiments, the spatial offset of columns of fibers in the dispersion dimension may be as small as 5 microns and as large as several millimeters.

Figure 3:
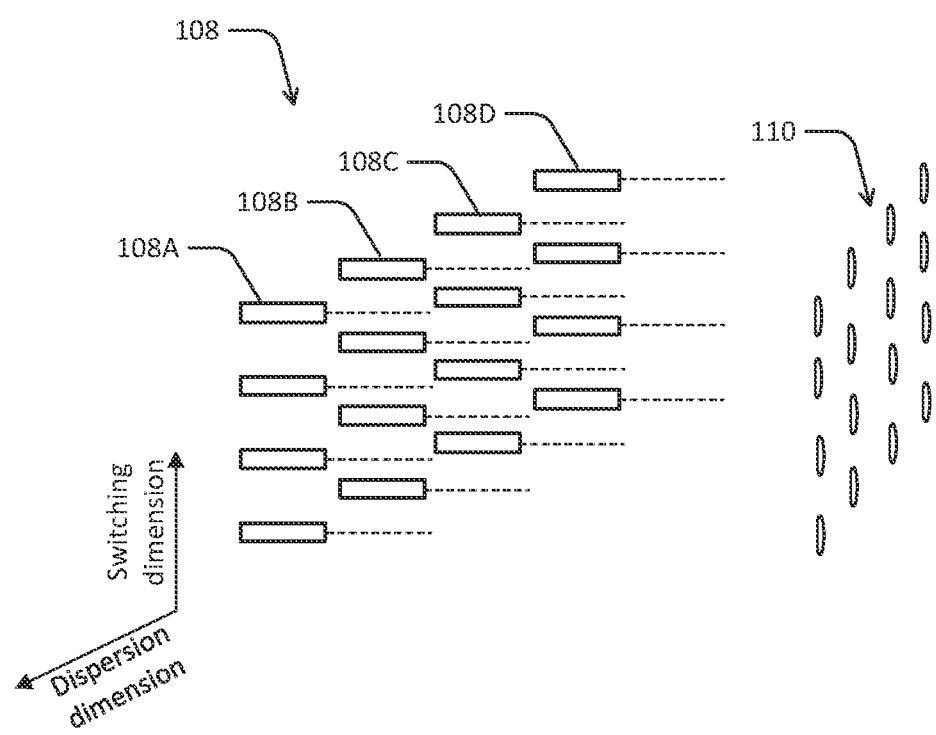
FIG. 3 is a side schematic illustrating an arrangement of input optical fibers for a multi-device WSS capable of switching channels from four independent optical sources.

The fibers of each column are spatially separated along a switching dimension of WSS 100. The switching dimension is orthogonal to the dispersion dimension and represents an axis that the switching engine 112 angularly directs optical beams between input/output fibers of a column of fibers. It will be appreciated that array 102 may include other two-dimensional arrangements of optical fibers. By way of example, FIG. 3 illustrates an alternate array 108 of four columns 108A, 108B, 108C and 108D of four optical fibers.

Input fiber array 102 is preferably formed of a single unitary element and may be formed of a monolithic material. In some embodiments, array 102 may be formed of fiber v-groove arrays arranged back to back. In other embodiments, array 102 is formed of a wafer material having a thickness of a few millimeters and through which holes are etched. In a further embodiment, array 102 may be formed of or include a fiber capillary array device.

In WSS 100, each column of optical fibers may be connected to an independent optical source such that the optical fibers of each column correspond to an optical source that is independent of optical fibers of others of the two or more columns. In this manner, WSS 100 is able to independently switch beams from different optical sources in a similar manner to separate switching devices. In other words, the components of WSS 100 operate as multiple independent WSS devices within a single shared piece of hardware. This allows for increasing a communication system's data throughput and flexibility without increasing the number of WSS modules needed.

Figure 4:
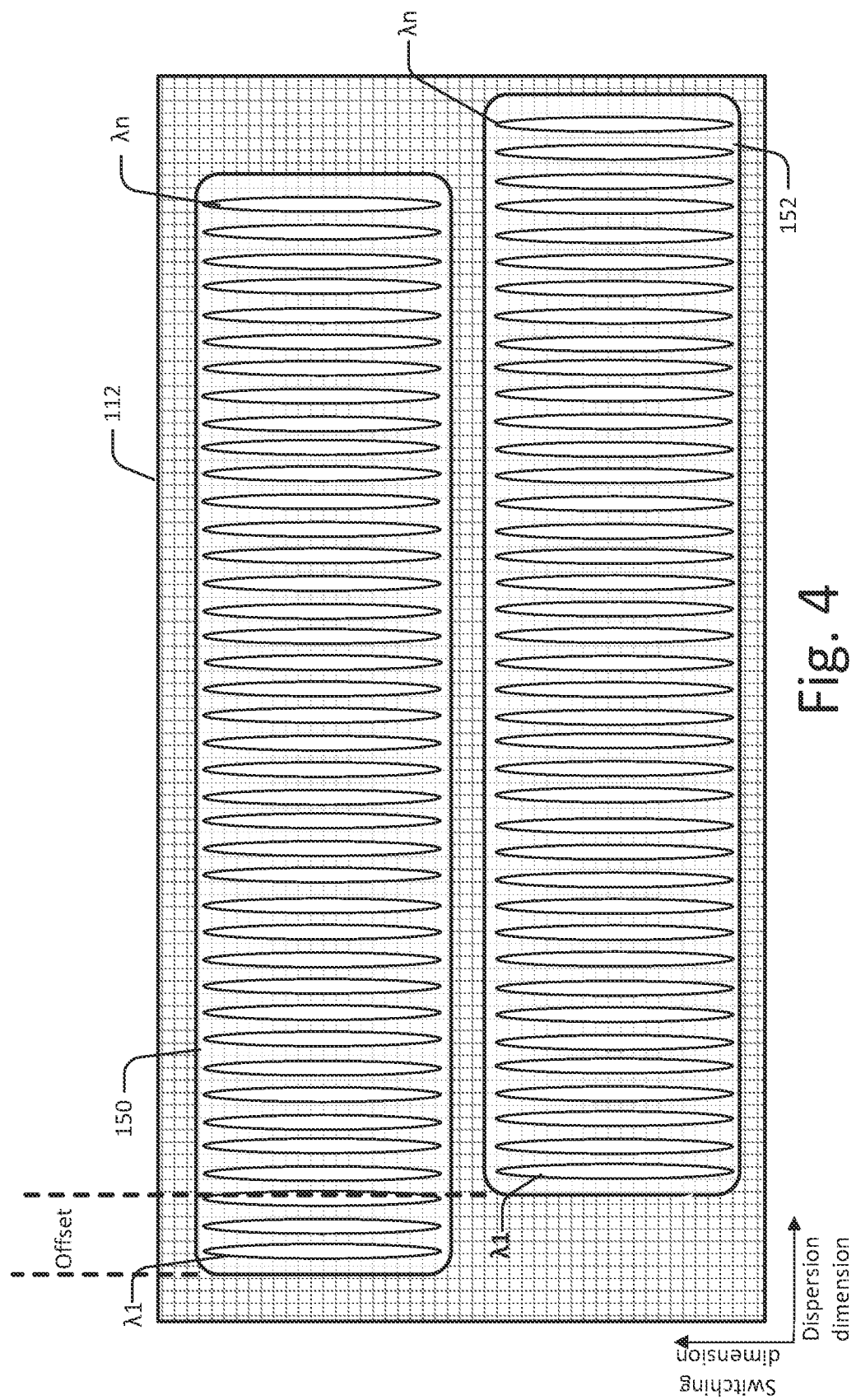
FIG. 4 is a front view of a switching engine illustrating the relative positioning of beams and wavelength channels from two different optical sources.

The physical offset between the columns of array 102 in the dispersion dimension reduces light interfering (crosstalk) between each of the independent optical sources and thereby increases device isolation. Thus, the physical distance between columns is a key design parameter for WSS 100 to provide sufficient device isolation. Referring to FIG. 4, there is illustrated a schematic front view of switching engine 112 showing beam spots corresponding to wavelength channels from a first optical source 150 and second optical source 152. The horizontal axis represents the dispersion dimension while the vertical axis represents the switching dimension. As illustrated, the beams of source 150 are directed to an upper region of switching engine 112 while the beams of source 152 are directed to a lower region of switching engine 112. Within the region of each source, individual horizontal columns represent the dispersed wavelength channels of a beam from an input fiber.

The horizontal offset between the two sources (indicated by the dashed line) is due to the spatial offset between columns of input optical fibers in the dispersion dimension that is illustrated in FIGS. 1 to 3. This horizontal offset ensures that similar wavelengths of different optical sources are not incident onto the switching engine 112 at similar locations, thereby increasing device isolation.

The vertical offset between sources 150 and 152 is due to angular and/or polarization encoding as described below. In some embodiments, there is no vertical offset between sources and the beams from the plurality of sources can be directed onto the switching engine 112 at horizontally separated regions. However, this may require a significant spatial offset of the input optical fibers and limitations on the spectral usage at the switching engine.

Figure 5:
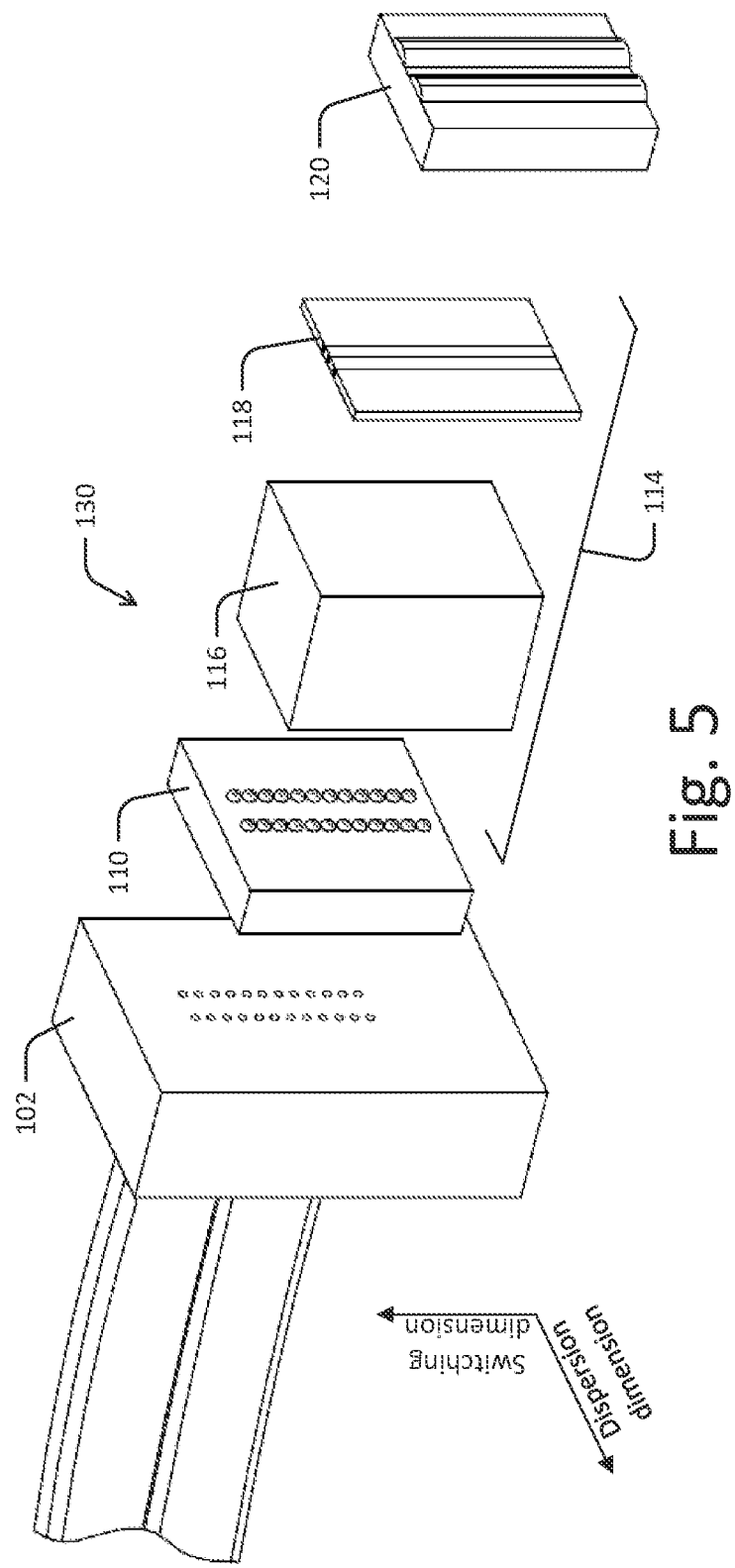
FIG. 5 a schematic perspective view of a front-end of the multi-device WSS of FIG. 1.
Figure 6:
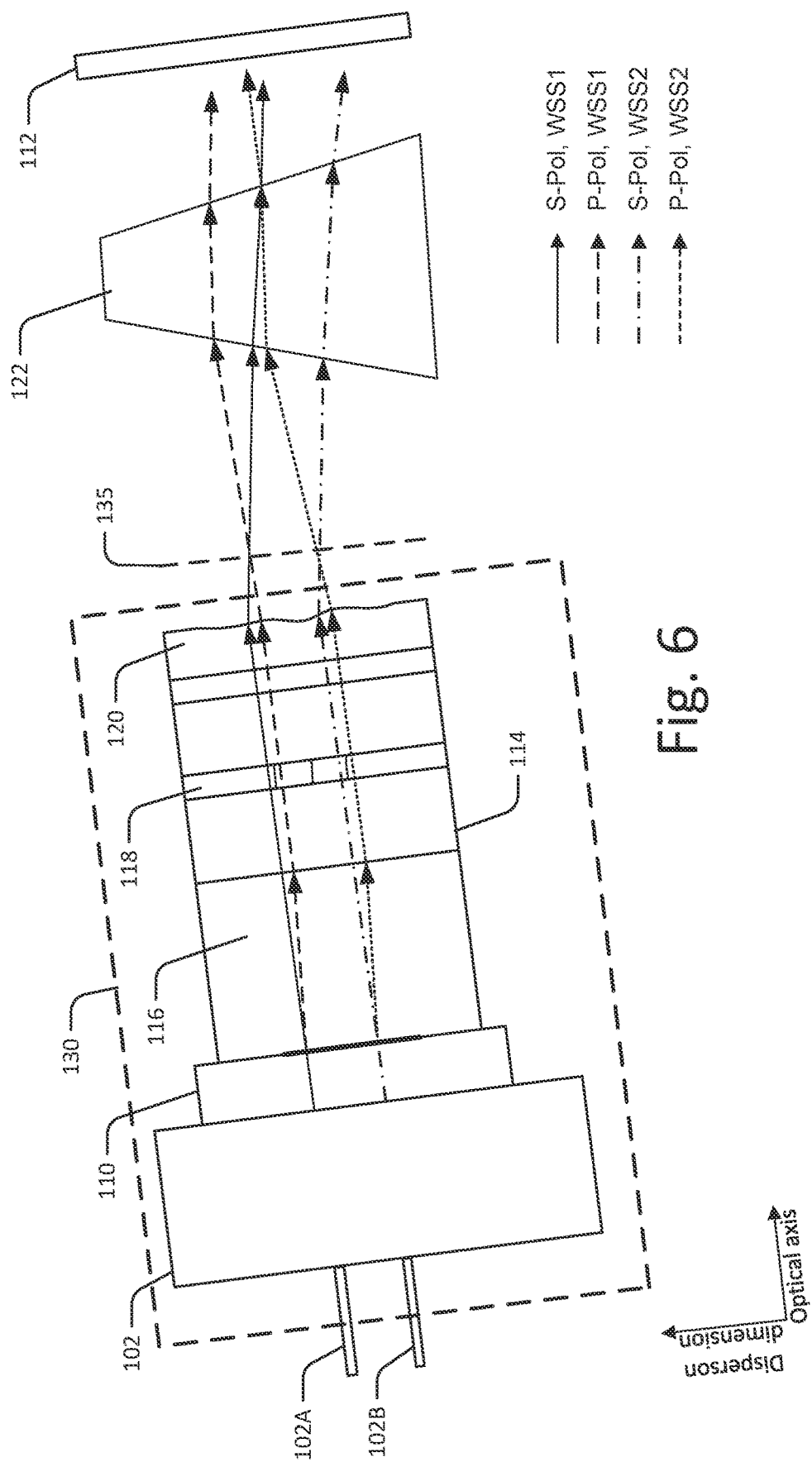
FIG. 6 is a schematic plan view of the multi-device WSS of FIG. 1 showing example beam trajectories through to a switching engine.

Referring to FIGS. 5 and 6, expanded views of the front end 130 of WSS are shown. WSS 100 includes a two dimensional microlens array 110 disposed adjacent the input array 102 of optical fibers. Microlens array 110 includes an array of microlenses that is like in configuration to the input array 102 of optical fibers. As such, microlens array 110 includes a microlens corresponding to each of the input optical fibers of input array 102. Thus, for the input fiber array illustrated in FIGS. 1 and 2, microlens array 110 includes two columns of eight microlenses. Other arrangements of optical fiber arrays will include a corresponding array of microlenses matching that arrangement.

Figure 7:
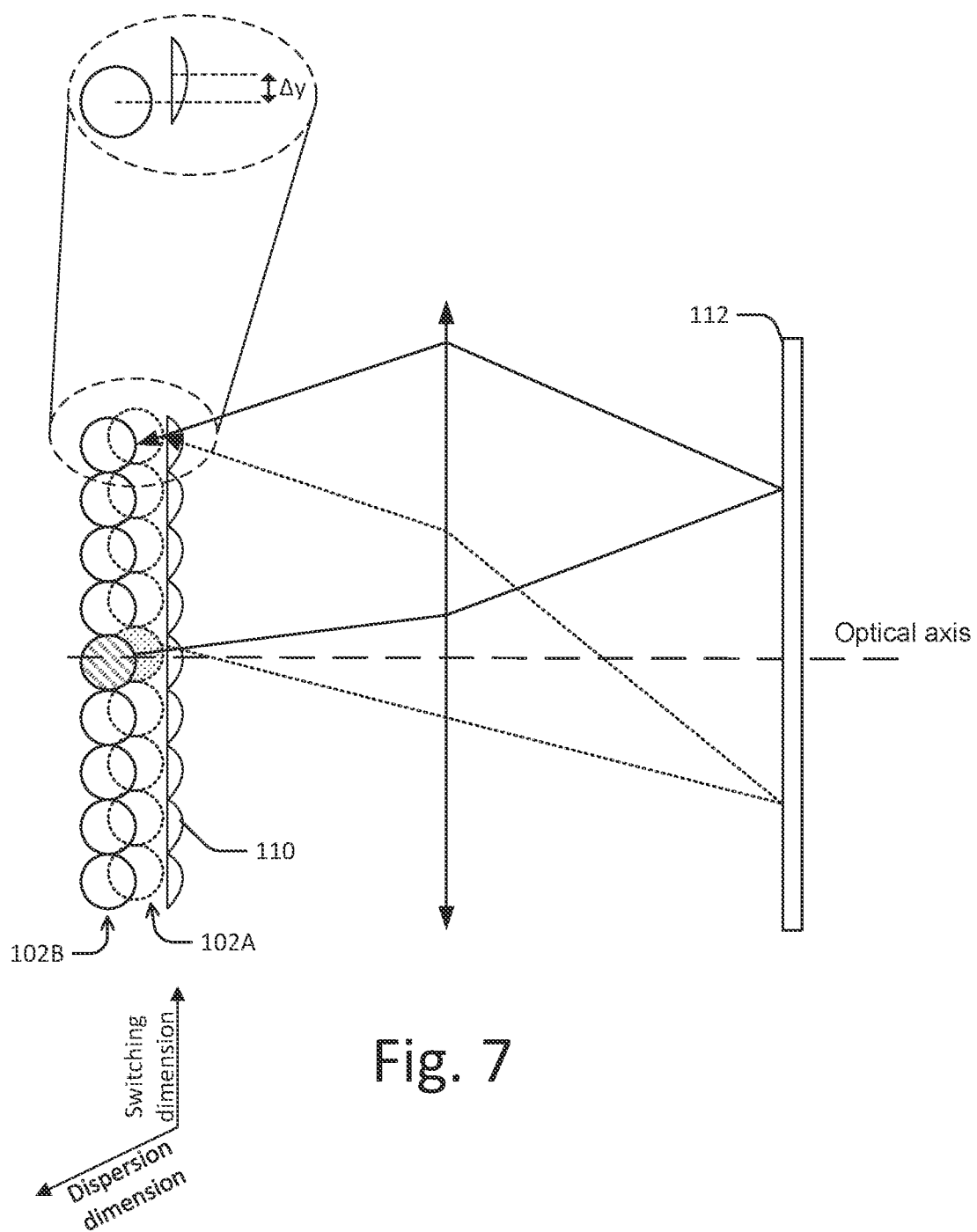
FIG. 7 is a schematic illustration of beam trajectories between input fibers and microlenses, and a switching engine arising from lens offsets between columns of fibers.

The microlenses of microlens array 110 are adapted to both collimate the input optical beams from the fibers and also, in some embodiments, create a pointing or angular encoding of the beams in the switching axis for subsequent propagation through WSS. Referring to FIG. 7, in some embodiments, the angular encoding is provided, at least in part, by a spatial offset of one or both input arrays 102A and 102B relative to the microlens array 110. In FIG. 7, input array 102B is aligned with the microlenses of microlens array 110 but input array 102A is spatially offset relative to the microlens array 110 so that the beams do not pass directly through the center of the microlenses. This causes the beams to be angularly encoded and steered in one direction in the switching dimension and onto a different region of the switching engine 112, as illustrated in FIG. 4.

The relative spatial offset between a column of fibers and the microlens array may be provided by shifting the location of the holes in the fiber array for a column or equivalently shifting the location of microlenses corresponding to that column. Microlens arrays or fiber arrays may be designed and manufactured to suit these desired functions.

The spatial offset between fibers and microlenses in the switching dimension is specified to be a predefined distance which provides the angular encoding of the optical beams to direct the beams of a first column of fibers 102A onto a first region of a switching engine 112 and the beams of a second column of fibers 102B onto a second region of the switching engine 112. In some embodiments, the predefined distance is in the micron range. The amount of offset is dependent on system parameters such as the distance to the switching engine 112, the size and type of switching engine 112, focal power of the microlenses and remaining optical elements and desired port isolation between different optical sources. The spatial offset ($\Delta y$) between fibers and microlenses may be defined by the following equation:

$$\Delta y = \frac{f_1}{f_2} \times D$$

where $f_1$ is the focal length of the microlenses, $f_2$ is the focal length of a primary lens of lenses 124 and D is a desired spatial offset between the different regions on switching engine 112. By way of example, with $f_1$ of 1 mm, $f_2$ of 100 mm and a desired switching engine offset of 1 mm, the required spatial offset between fibers and microlenses is 0.01 mm.

Figure 8:
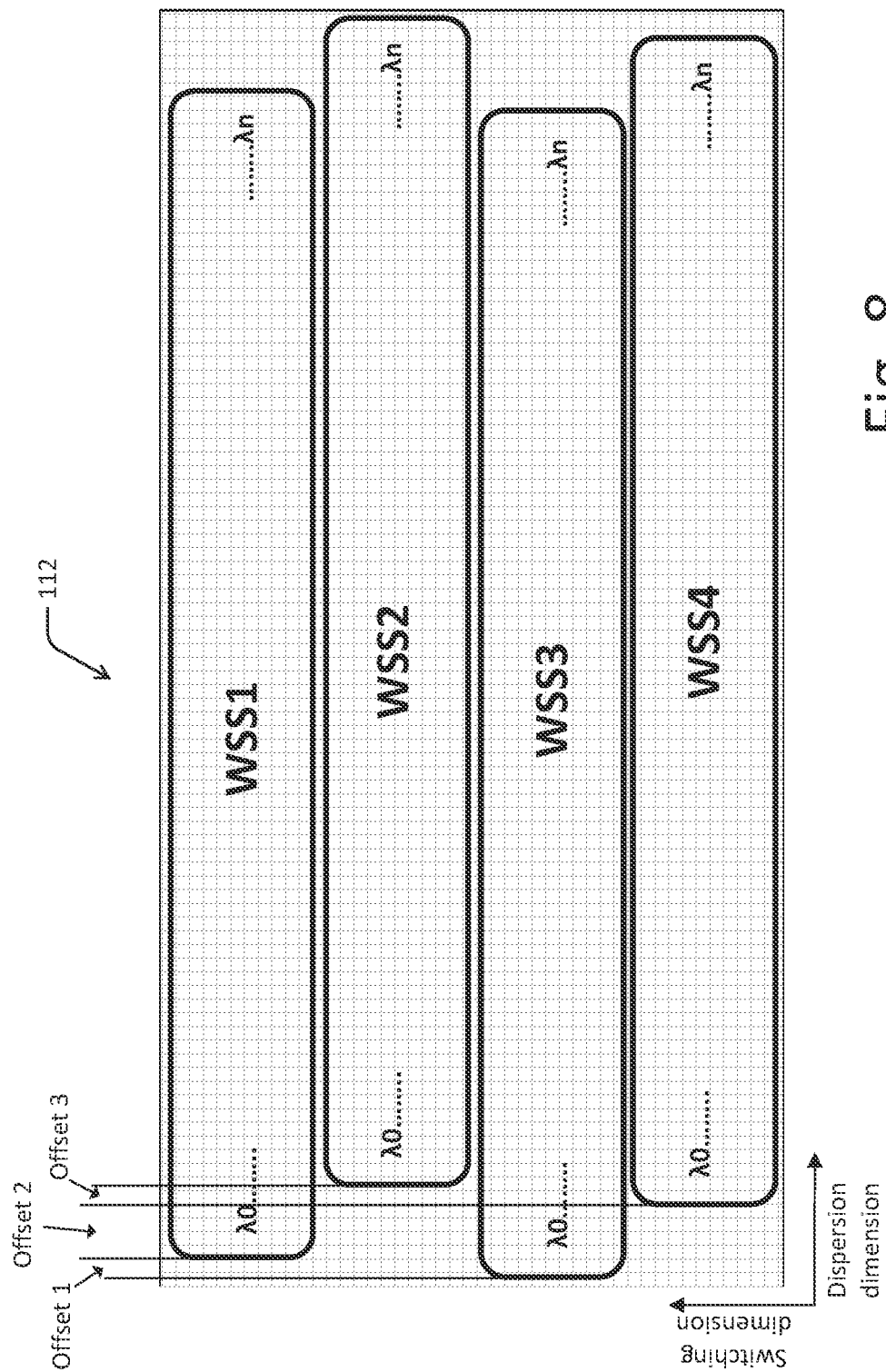
FIG. 8 is a front view of a switching engine illustrating the relative positioning of beams from four different optical sources.

As illustrated in FIGS. 4 and 7, beams from column 102A are angularly encoded to be directed onto a lower region of switching engine 112 while beams from column 102B are angularly encoded to be directed onto an upper region of switching engine 112. When scaled up to four independent optical sources, front-end 130 of WSS 100 is capable of directing four groups of beams onto different regions of switching engine 112. Referring to FIG. 8, there is illustrated a switching engine 112 configured to switch beams from four separate devices (labelled WSS1-WSS4) such as in the embodiment illustrated in FIG. 3.

In some embodiments, the optical fibers of array 102 are oriented at respective angles relative to the optical axis to provide angular encoding to the respective optical beams. This angling of the fibers provides an alternate mechanism for separating the beams from independent optical sources. The orienting of optical fibers may be performed at the time of manufacturing the fiber array. This fiber orientation may be provided by structural modifications to array 102 such as defining V grooves that have different angles or etching holes having predefined angles through a wafer substrate. Different columns of fibers or holes in fiber array 102 may be defined to have unique angles to define corresponding offsets of the optical sources at the switching engine 112.

Figure 9:
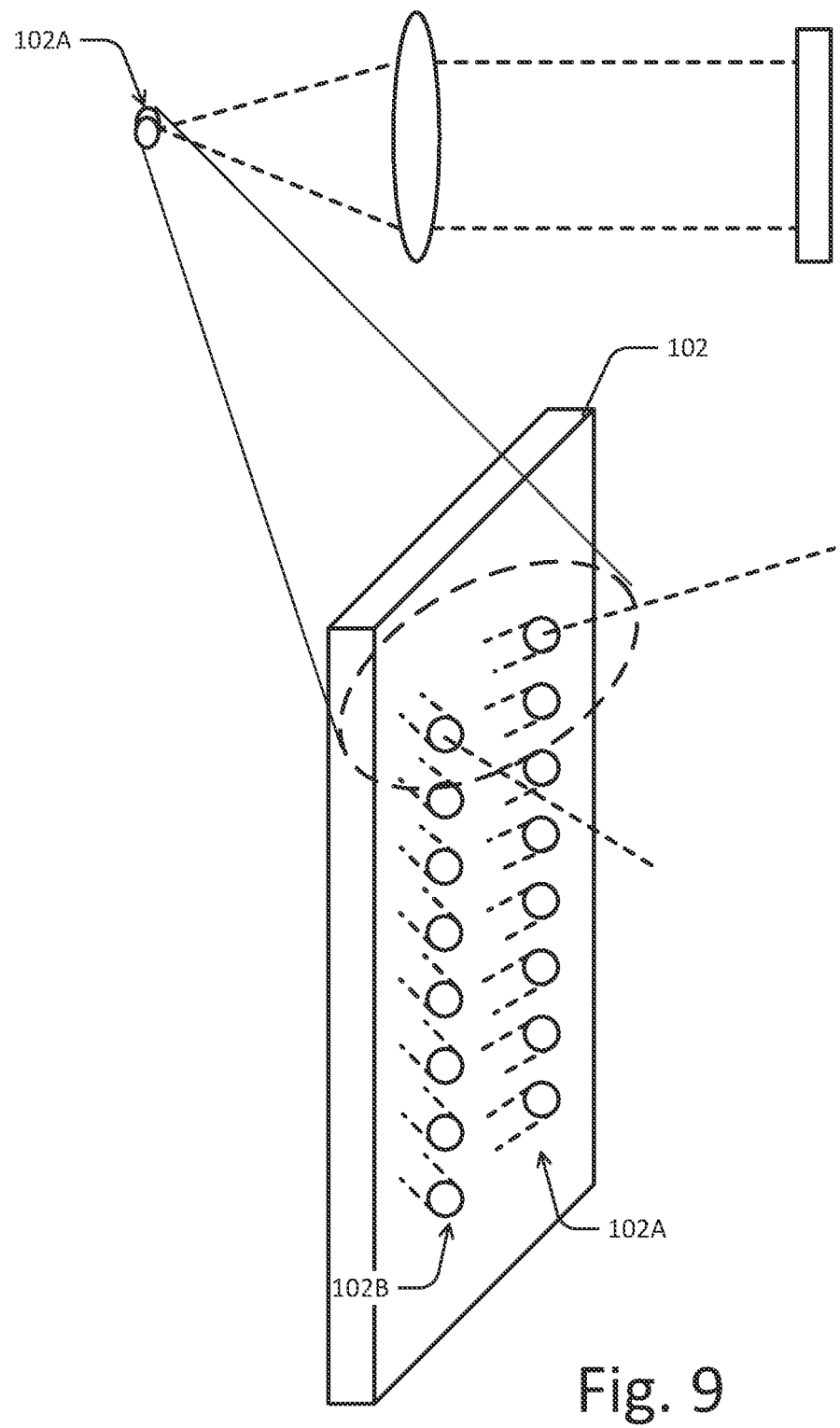
FIG. 9 is a schematic view of a fiber array substrate having holes etched at different angles.

This is illustrated in FIG. 9, which shows a wafer substrate with a first column 102B of fiber holes etched with a general downward angle and a second column 102A of fiber holes etched with a general upward direction. When fibers are inserted into array 102, the fibers will project beams at angles corresponding to the hole direction to angularly distinguish beams from the two columns 102A and 102B. This angular encoding corresponds to a spatial offset at the switching engine 112 to spatially separate beams from two different optical sources. Note that the angles of the holes relative to the optical axis is exaggerated in FIG. 9 for clarity.

Referring again to FIGS. 5 and 6, front-end 130 of WSS 100 also includes a polarization manipulation module 114 configured to independently manipulate the polarization of each column of optical beams. Module 114 includes optical elements such as a birefringent walk-off crystal 116 to separate the polarization states of each optical beam and a partitioned half waveplate 118 (or a plurality of half-wave plate segments) to equalize the two polarization states within each column of fibers. Additional optics may also be included in module 114. Exemplary polarization diversity control in a single and dual source WSS is outlined in U.S. Pat. No. 10,461,878 to Frisken, entitled "Polarization diverse wavelength selective switch" and assigned to II-VI DELAWARE, INC., the entire contents of which are incorporated herein by way of cross-reference. A system similar that described in U.S. Pat. No. 10,461,878 can be used in module 114. However, module 114 must be adapted to be able to independently manipulate beams from multiple sources simultaneously.

The polarization states of the beams from different optical sources (columns of fibers) may be selected to be the same, orthogonal or unique to each other based on the components used in module 114. Using module 114, polarization states can be separated and manipulated to provide polarization diversity in a manner similar to that of U.S. Pat. No. 10,461,878. In some embodiments, the polarization encoding provided by module 114 can be used to provide device separation of the beams originating from independent optical sources (columns of fibers) as described below.

Referring again to FIGS. 1 and 2, WSS 100 includes a cylindrical focusing module in the form of a single cylindrical lens or cylindrical lens array 120, which is configured to focus the two equalized polarization states of each column of fibers to a common focal plane 135 illustrated in FIG. 6. In the two-column embodiment of FIGS. 1 and 2, component 120 includes a pair of cylindrical lenses, with one cylindrical lens adapted to focus beams for a respective one of the two columns. By way of example, a device having 4 columns of fibers may include an array of four cylindrical lenses, each configured to perform focusing for a respective column of fibers. In some embodiments, cylindrical lens array 120 forms part of polarization manipulation module 114.

Incorporating beams from independent optical sources in a side-by-side arrangement provides wavelength axis device separation and enables switching of multiple devices within a single WSS. However, this wavelength axis separation creates a device dependent focus aberration in the dispersion dimension. This can be at least partially corrected for by incorporating a device dependent focal delay correction into WSS 100.

In this regard, WSS 100 also includes a focus delay element in the form of wedge prism 122, as best shown in FIG. 6. Wedge prism 122 is adapted to apply an optical delay that is dependent on the column from which the optical beam originated. Wedge prism 122 is preferably formed of a glass material (e.g. BK7 developed by Schott AG) and has a thickness that tapers across the dispersion dimension so as to provide a variable optical path length that corrects the focal aberrations which are introduced by spatially separating the devices in the wavelength axis. In particular, wedge prism 122 is capable of matching path lengths of beams from different optical sources.

In other embodiments, the focus delay element can be implemented in the form of one or more cylindrical lenses. In some embodiments, cylindrical lens pair 120 can be adapted to also perform focus delay correction by incorporating different radii of curvature and/or thickness. By way of example, the focal powers of the cylindrical lenses within pair 120 can be made different such that the focus of the beams substantially matched at the switching engine 112. Incorporating focal delay correction is necessary to simultaneously optimize the performance of all of the optical sources.

Figure 10:
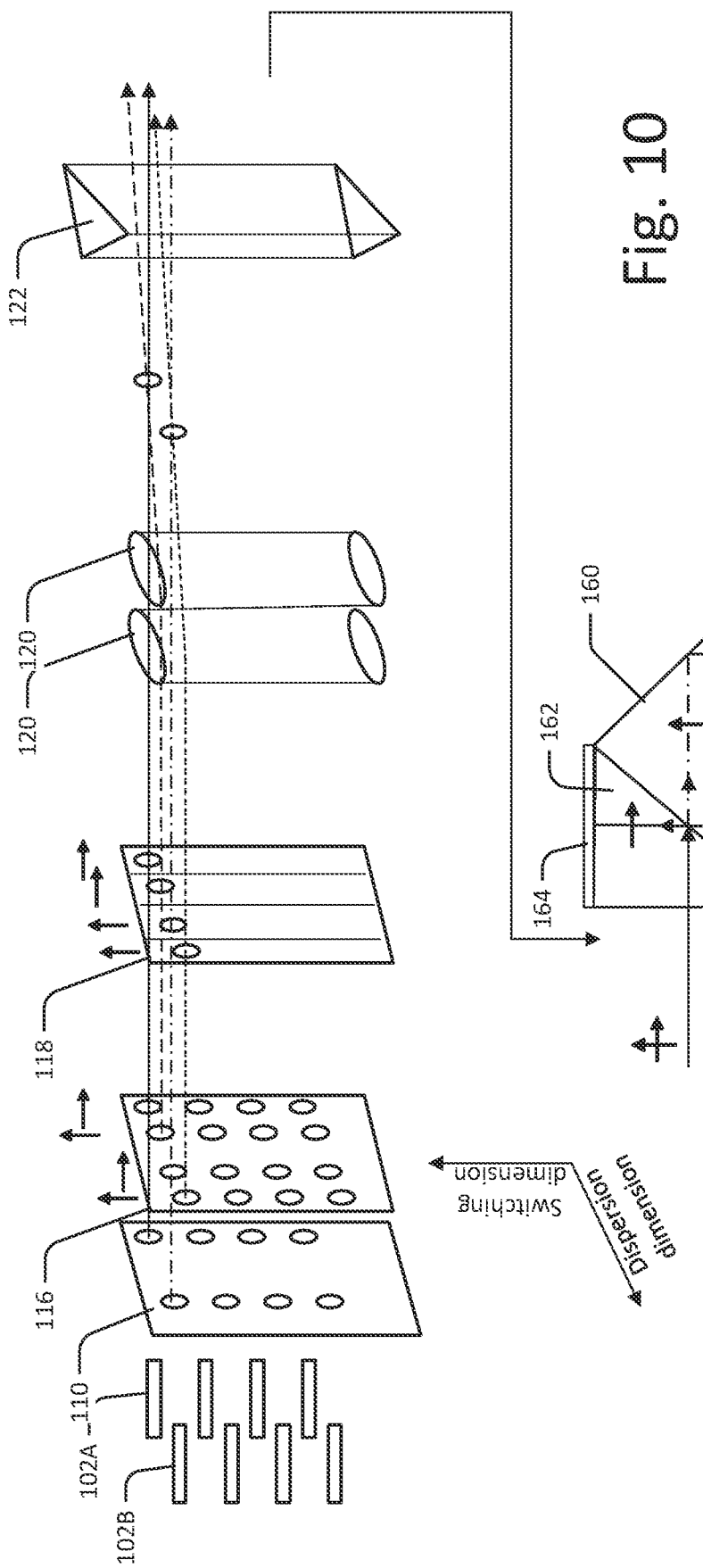
FIG. 10 is a schematic side view of a multi-device WSS which uses polarization separation to spatially separate two optical sources onto a switching engine.
Figure 11:
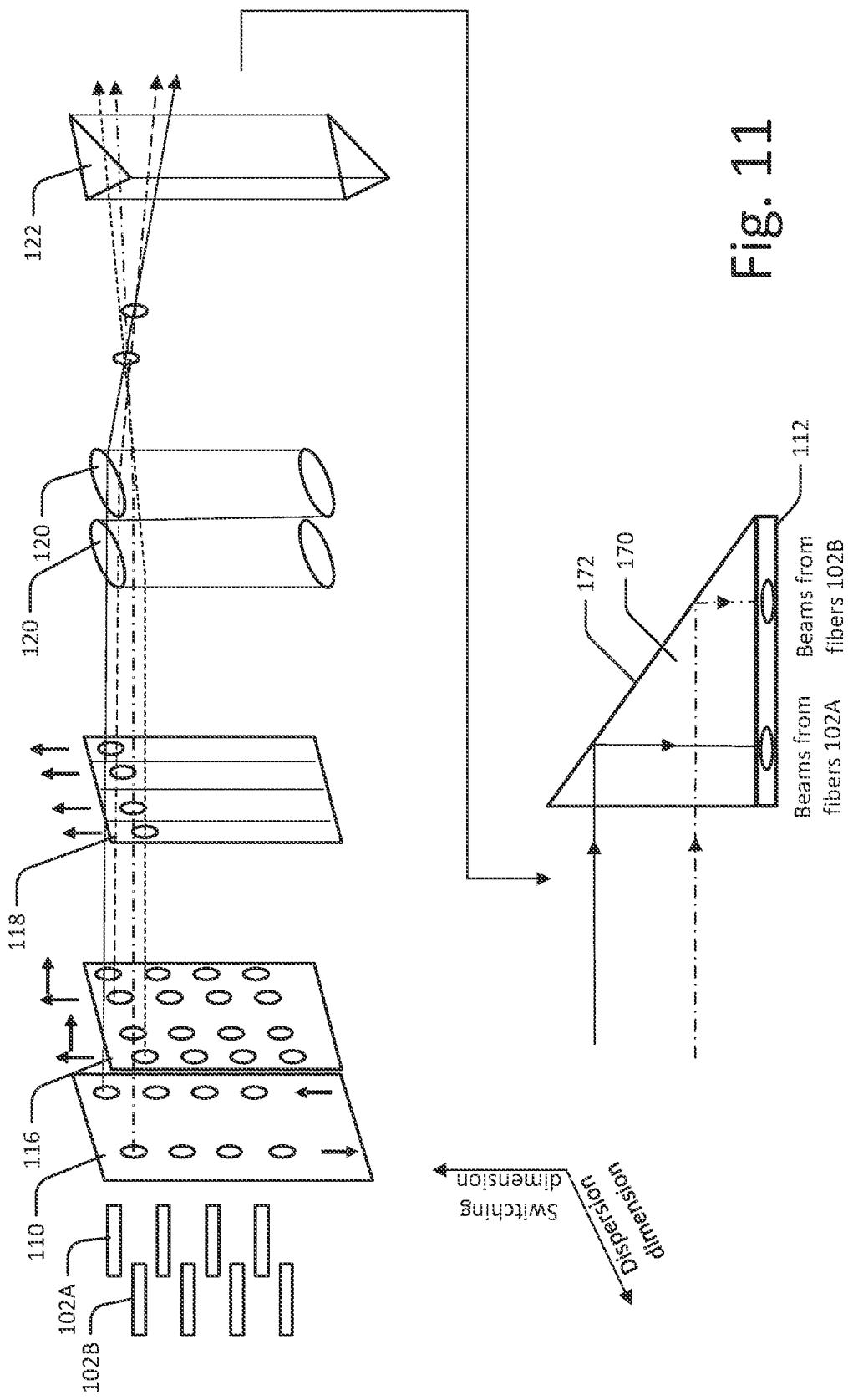
FIG. 11 is a schematic side view of a multi-device WSS which uses angular separation to spatially separate two optical sources onto a switching engine.

Referring to FIGS. 10 and 11, there are illustrated schematic side views of WSS 100 illustrating exemplary beam trajectories through polarization diversity module 114 and other optical elements. In FIG. 10, walk-off crystal 116 spatially separates orthogonal polarization states of beams from both input fiber arrays 102A and 102B. Partitioned half waveplate 118 is configured to rotate the horizontal polarization components of fibers 102B by 90 degrees so that they are vertical and to rotate the vertical components of fibers 102A by 90 degrees so that they are horizontal and perpendicular to those of fibers 102B. The polarized beams are then focused by cylindrical lens array 120 and passed through wedge prism 122 before being passed through primary collimating/focusing elements 124 (not shown) and dispersive element 126 (not shown) to switching engine 112.

A separation element 160 in the form of a polarizing prism is disposed adjacent to or mounted onto the switching engine 112. Separation element 160 is adapted to spatially separate the orthogonally polarized beams from the different columns of fibers using a polarization beamsplitter 162, half-wave plate 164 to rotate the polarization of a reflected component by 90 degrees and direct the beams onto different regions of the switching engine 112.

In FIG. 11, partitioned half waveplate 118 is configured to rotate the separated polarization states of beams from both input fiber arrays 102A and 102B into a vertical orientation. Element 110 has an offset in position in the switching axis to create the angular encoding, which corresponds to a spatial offset at the switching engine 112. This offset is indicated by the arrows in FIG. 11.

A directing element 170 in the form of a prism with an angled face 172 directs the beams originating from input fiber arrays 102A and 102B onto different regions of the switching engine 112.

The embodiments described above can provide multi-WSS functionality in a single hardware device by a number of different techniques, including:

Providing spatial separation, in the dispersion dimension, of beam trajectories for different optical sources for device separation or wavelength offsetting at the switching engine 112. This is provided by a spatial offset of fiber arrays across the dispersion dimension.

Providing angular separation, in the switching dimension, of beam trajectories for device separation at the switching engine 112. This is provided by one or more of angling the optical fibers of different optical sources relative to each other in the switching dimension and/or offsetting fibers with respect to corresponding microlenses to perform angular encoding.

Providing spatial or angular separation, in the switching dimension, of beam trajectories for device separation at the switching engine through polarization control. This can be provided by splitting and manipulating the polarization components of beams from different optical sources such that they are separated in polarization state and/or angle for propagation onto different regions of the switching engine 112.

Compared with previous dual source WSS designs, focal delay correction can be advantageously provided by incorporating a tailored wedge prism placed at some point after a cylindrical lens to match path lengths of beams from different optical sources. The cylindrical lens or lens array must also have focal properties that match the path for the particular beams. Alternatively, path lengths of the beams may be matched by incorporating different focal power into the cylindrical lenses.

Side-by-side configuration of optical fibers and optical sources creates wavelength offsetting and further device isolation. The side-by-side configuration of fibers also reduces the optical footprint of the overall WSS device. Angular separation of the beams by lens offsetting allows the device to be scalable to more than two devices. Polarization multiplexing at the switching plane allows for doubling of devices without increasing optical footprint.

The spatial, angular and/or polarization separation of beams from different optical sources in either or both of the dispersion or switching dimension provides for device isolation and allows devices to be multiplexed without increasing the physical size of the WSS.

Interpretation

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Embodiments described herein are intended to cover any adaptations or variations of the present invention. Although the present invention has been described and explained in terms of particular exemplary embodiments, one skilled in the art will realize that additional embodiments can be readily envisioned that are within the scope of the present invention.

What is claimed is:

1. A wavelength selective switch, comprising:
   an input array of optical fibers, the array comprising two or more columns of fibers that are spatially offset in one or both of a switching dimension or a dispersive dimension of the wavelength selective switch, each column of fibers being adapted to project respective optical beams;
   a polarization manipulation module configured to independently manipulate the polarization of each column of optical beams; and
   a switching engine positioned to receive the respective optical beams and apply an angular switching to the beams to direct the beams to respective output fibers;
   wherein the optical beams are encoded at respective angles and/or polarization states such that each column of optical beams is incident onto a different region of the switching engine.

2. The wavelength selective switch according to claim 1 wherein the optical fibers of each column correspond to an optical source that is independent of optical fibers of others of the two or more columns.

3. The wavelength selective switch according to claim 1 including a two dimensional microlens array disposed adjacent to the input array of optical fibers, the microlens array having a microlens corresponding to each of the input optical fibers.

4. The wavelength selective switch according to claim 1 including a focus delay element adapted to apply an optical delay that is dependent on the column from which the optical beam originated.

5. The wavelength selective switch according to claim 4 wherein the focus delay element includes a wedge.

6. The wavelength selective switch according to claim 4 wherein the focus delay element includes a cylindrical lens.

7. The wavelength selective switch according to claim 1 wherein the switching engine includes a liquid crystal on silicon (LCOS) device.

8. The wavelength selective switch according to claim 1 wherein the polarization manipulation module is configured to encode the beams of each column of fibers with a corresponding polarization state.

9. The wavelength selective switch according to claim 8 wherein the beams of a first column of fibers are polarized into a first polarization state and the beams of a second column of fibers are polarized into a second polarization state.

10. The wavelength selective switch according to claim 1 wherein a distance of the spatial offset of the columns of fibers is selected based on a predefined threshold isolation between beams of different columns.

11. The wavelength selective switch according to claim 1 wherein the input array of optical fibers is formed of a single unitary element.

12. The wavelength selective switch according to claim 1 wherein the input array of optical fibers is formed of a monolithic material.

13. A wavelength selective switch, comprising:
   an input array of optical fibers, the array comprising two or more columns of fibers that are spatially offset in one or both of a switching dimension or a dispersive dimension of the wavelength selective switch, each column of fibers being adapted to project respective optical beams;
   a switching engine positioned to receive the respective optical beams and apply an angular switching to the beams to direct the beams to respective output fibers; and
   a two dimensional microlens array disposed adjacent to the input array of optical fibers, the microlens array having a microlens corresponding to each of the input optical fibers,
   wherein the respective optical beams are encoded at respective angles and/or polarization states such that each column of optical beams is incident onto a different region of the switching engine, and
   wherein the microlens array is offset from the input array of optical fibers by a predefined distance in the switching dimension or dispersion dimension to provide angular encoding to the respective optical beams.

14. The wavelength selective switch according to claim 3 wherein the two dimensional microlens array is made up of multiple, separated 1D arrays, each aligned to a respective column of fibers.

15. A wavelength selective switch, comprising:
   an input array of optical fibers, the array comprising two or more columns of fibers that are spatially offset in one or both of a switching dimension or a dispersive dimension of the wavelength selective switch, each column of fibers being adapted to project respective optical beams;
   a switching engine positioned to receive the respective optical beams and apply an angular switching to the beams to direct the beams to respective output fibers; and
   wherein the respective optical beams are encoded at respective angles and/or polarization states such that each column of optical beams is incident onto a different region of the switching engine, and
   wherein the optical fibers are oriented at respective angles in the switching dimension or dispersion dimension relative to an optical axis to provide angular encoding to the respective optical beams.

16. A wavelength selective switch, comprising:
   an input array of optical fibers, the array comprising two or more columns of fibers that are spatially offset in one or both of a switching dimension or a dispersive dimension of the wavelength selective switch, each column of fibers being adapted to project respective optical beams;
   a switching engine positioned to receive the respective optical beams and apply an angular switching to the beams to direct the beams to respective output fibers; and
   a plurality of optical directing elements configured to apply angular encoding to the optical beams, wherein the respective optical beams are encoded at respective angles and/or polarization states such that each column of optical beams is incident onto a different region of the switching engine.

17. A wavelength selective switch, comprising:
an input array of optical fibers, the array comprising two or more columns of fibers that are spatially offset in one or both of a switching dimension or a dispersive dimension of the wavelength selective switch, each column of fibers being adapted to project respective optical beams; and
a switching engine positioned to receive the respective optical beams and apply an angular switching to the beams to direct the beams to respective output fibers,
wherein the respective optical beams are encoded at respective angles and/or polarization states such that each column of optical beams is incident onto a different region of the switching engine
wherein optical beams within each column are encoded with a common angle in the switching dimension relative to the optical axis.

18. The wavelength selective switch according to claim 8 including a polarization manipulation module configured to independently manipulate the polarization of each column of optical beams.

* * * * *